(12) United States Patent
Rich

(10) Patent No.: US 10,206,382 B2
(45) Date of Patent: Feb. 19, 2019

(54) FISHING APPARATUS

(71) Applicant: John Francis Rich, North Bundaberg (AU)

(72) Inventor: John Francis Rich, North Bundaberg (AU)

(*) Notice: Subject to any disclaimer, the term of this patent is extended or adjusted under 35 U.S.C. 154(b) by 0 days.

(21) Appl. No.: 14/529,420

(22) Filed: Oct. 31, 2014

(65) Prior Publication Data

US 2015/0128476 A1     May 14, 2015

(30) Foreign Application Priority Data

Nov. 11, 2013  (AU) ................................ 2013904360

(51) Int. Cl.
  *A01K 71/00*     (2006.01)
  *A01K 91/02*     (2006.01)
(52) U.S. Cl.
  CPC .................................. *A01K 91/02* (2013.01)
(58) Field of Classification Search
  CPC ...................................................... A01K 89/08
  USPC ....................................................... 43/7, 21.2
  See application file for complete search history.

(56) References Cited

U.S. PATENT DOCUMENTS

| 3,010,242 A * | 11/1961 | Meyer | A01K 89/08 43/21.2 |
| 3,367,056 A * | 2/1968 | Johnson | A01K 87/08 224/922 |
| 4,161,839 A * | 7/1979 | Ward | A01K 97/10 248/515 |
| 4,190,977 A * | 3/1980 | Casper | A01K 87/08 43/21.2 |
| 6,070,825 A * | 6/2000 | Rich | A01K 89/08 242/236 |
| 6,493,982 B1 * | 12/2002 | Macaluso | A01K 87/08 43/21.2 |
| 2005/0257416 A1 * | 11/2005 | Nyland | A01K 87/08 43/21.2 |
| 2011/0289818 A1 * | 12/2011 | Hannon | A01K 87/005 43/24 |

FOREIGN PATENT DOCUMENTS

AU     698795 B2    11/1998

* cited by examiner

*Primary Examiner* — Joanne Silbermann
(74) *Attorney, Agent, or Firm* — Christopher Pilling

(57) ABSTRACT

This invention relates to hand cast fishing apparatus which may support a conventional fishing reel to provide the benefits that a fishing reel provides combined with the simplicity and relative compactness of hand cast fishing apparatus. For this purpose the fishing apparatus provides a handpiece supporting a line guide for direct finger monitoring of the set fishing line and from which the line may be hand cast. The fishing reel of choice is attached to a mounting which extends from the handpiece and mounts to the user's forearm.

16 Claims, 3 Drawing Sheets

FISHING APPARATUS

CROSS-REFERENCE TO RELATED APPLICATIONS

This application claims priority under 35 U.S.C. § 119 to Australian Patent Application No. 2013904360 filed Nov. 11, 2013, the disclosure of which are incorporated by reference herein in its entirety.

DETAILED DESCRIPTION

This invention relates to fishing apparatus which enables a hand cast fishing line to be cast from, controlled by and retrieved onto a fishing reel.

Fishing has always been a very popular recreational activity and in recent years the supply of fishing products has spawned the growth of large commercial enterprises dedicated to the supply of a sophisticated array of products ranging from a selection of lures, lines, rods and reels as well as portage accessories and electronic fish finding products.

In past times recreational anglers were content with a simple hand reel filled with line to which a hook and sinker were attached and from which the line could be hand cast to a targeted area and then monitored by the feel of the line passing directly over the user's finger for monitoring activity at the hook. Line is retrieved by winding the line with one hand onto the hand reel held in the other hand.

While this simple form of fishing remains popular its application is limited compared to rod fishing which utilises sophisticated reels which provide easy retrieval and storage of the fishing line as well as finely adjustable drag devices which enable anglers to play fish without tensioning the fishing line to breaking point. In addition the user does not have to grasp the line to counter the pull of the hooked fish. This enables relatively large loads to be applied to thin fishing lines which if grasped directly could cut into the flesh of the angler's hand with the ever present potential for a loop of the fishing line ensnaring a user's hand.

As a result the advantage of simplicity and compactness of hand cast fishing devices for easy storage and transport is frequently forfeited for the benefits of safety and line control provided by a rod and reel.

Reels for rods are hand driven for rotation of either the reel or a winding mechanism about a reel axis and are formed with supports whereby they may be readily removed from and attached to standard adjustable mountings provided on fishing rods. This enables anglers to set up their rod and reel combination to suit their mood or fishing conditions. There are many types of hand driven reels such as eggbeater reels, spinning reels, side cast reels, flycast reels and offshore reels, for example, all of which will be collectively referred to hereinafter as "fishing reels" as opposed to hand reels.

BACKGROUND ART

Previous attempts have been made to provide fishing apparatus which combine the benefits of hand casting and line storage on a fishing reel, as is disclosed in my earlier Australian Patent No. 698,796. However while the apparatus disclosed therein can be used successfully such apparatus requires the angler forego fishing postures developed through using fishing rods and of course they are restricted to using the fishing reel type provided in the apparatus which is sold as an encapsulated unit which cannot be changed by the angler to suit their instant requirements.

This invention aims to provide fishing apparatus which will enable an angler to enjoy the benefits of hand cast fishing as well as the benefits provided by the use of sophisticated fishing reels and which will alleviate one or more of the disadvantages of the previously available hand cast fishing apparatus.

SUMMARY OF INVENTION

With the foregoing in view, this invention in one aspect resides broadly in hand cast fishing apparatus including:
 a handpiece;
 a line guide at or adjacent the outer end of the handpiece through which fishing line may pass for casting, and
 a reel mounting associated with the handpiece for securing a fishing reel thereto for feeding fishing line from the fishing reel through the line guide.

Preferably the reel mounting is formed for releasably connecting a conventional fishing reel to the fishing apparatus whereby a user may connect their fishing reel of choice to the handpiece. However the fishing reel could be secured non-releasably to the handpiece if desired.

The handpiece may provide the only means of supporting the fishing apparatus. Preferably however the handpiece is associated with a support assembly which includes a removable mounting for the fishing reel and an arm support for at least partially supporting a mounted fishing reel.

The arm support may be an adjustable strap, a loop or hook for example, through which a user's hand and arm may pass for grasping the handpiece or which at least partially captures a portion of the user's forearm to provide support for the mounted fishing reel. The arm support may be a saddle which passes over the forearm or an inverted saddle which engages the underside of a user's forearm.

Preferably the removable mounting for the fishing reel is formed to operatively position the reel in an underslung position beneath the support assembly and beneath a user's forearm such that the apparatus may be comfortably maintained in an operative position awaiting a fish catch by the support assembly without requiring firm attachment to a user's arm or a firm grip of the handpiece.

It is also preferred that the support assembly extends from the handpiece so as to lie, in use, along the underside of a user's forearm whereby downward line pressure which may be exerted on the line guide is reacted against the underside of the user's forearm so as to reduce the load placed on the user's wrist which as a result may be maintained in a comfortable load supporting attitude while retrieving cast line onto the fishing reel. Preferably the connection between the handpiece and the arm support is selectively adjustable to enable the handpiece to be positioned for comfortable support by a user.

In the preferred form the outer line guide positions the fishing line for passage across a user's finger held extended from the handgrip whereby the fishing apparatus may be supported and monitored by one arm and hand of an angler leaving their other arm and hand free to operate the fishing reel and to hand cast the line from the fishing apparatus.

Alternatively an angler may monitor the cast line with their free hand if desired and whereby the handpiece may be formed, or be made adjustable, to extend beyond the supporting hand of the user so as to provide more leverage to the cast line for initial retrieval reaction to a bite or to provide an extra in-line handgrip for playing heavy fish.

The handpiece may be of any suitable form such as of pistol grip form or of in-line handle form. The handpiece may have an external line guide or guides for leading line from the fishing reel to the outer line guide which may be positioned adjacent the anticipated extended forefinger position on the handle for line monitoring thereby.

Alternatively the handpiece may have an internal line passage which shields the line in the region of the handgrip and wherein the line passage exits the handpiece adjacent the anticipated extended forefinger position and whereby the open exit end of the line passage constitutes the outer line guide. In a preferred form the line passage is a straight through passage extending substantially axially through the handpiece and wherein the reel mounting positions the supported reel for line feed therefrom substantially in-line with the line passage so as to minimise line feed resistance between the reel and the line guide.

The handpiece and reel mounting may be formed substantially as a one piece moulding, or of moulded, machined or fabricated components. These may be formed in different sizes such as to suit large, medium and small anglers and in right hand and left hand configurations. Alternatively, the major components of the fishing apparatus may be connected together so that a manufacturer or an angler may configure the apparatus to suit their requirements. For this purpose the support assembly may provide both left and right hand mountings for the fishing reel and connections for the handpiece.

In a further aspect this invention resides in hand cast fishing apparatus including:
  a handpiece provided with an internal line passage forming a line guide through which fishing line may pass from the fishing apparatus for hand casting;
  a support assembly formed so as to extend from an adjustable mounting for the handpiece along the underside of the forearm of a user operatively grasping the handpiece;
  an upwardly opening saddle extending from the end of the support assembly remote from the adjustable mounting for capturing the user's forearm, and
  a releasable reel mounting on the saddle for supporting a fishing reel in an underslung position beneath the support assembly for feeding fishing line from the fishing reel through the internal line passage.

Preferably the hand cast fishing apparatus has a support on each opposed portion of the saddle for supporting a releasable fishing reel mounting. It is also preferred that the adjustable mounting for the handpiece is formed by a trunnion mounting extending across the end of the support assembly whereby the handpiece may be selectively supported at either end of the trunnion mounting.

In yet a further aspect, this invention resides broadly in hand cast fishing apparatus including:—
  a handpiece;
  a line guide at or adjacent the outer end of the handpiece through which a fishing line may pass for casting, and
  line feeding and retrieval means connected to the handpiece for feeding and retrieving line from and to the line guide. Preferably the line feeding and retrieving means is a conventional fishing reel removably connected to the handpiece. Of course, if desired the line feeding and retrieval means could be formed integrally with the handpiece or with a support assembly associated with the handpiece.

DESCRIPTION OF EMBODIMENTS

In order that this invention may be more readily understood and put into practical effect, reference will now be made to the accompanying drawings which illustrate typical embodiments of this invention, and wherein.

Figure 1:
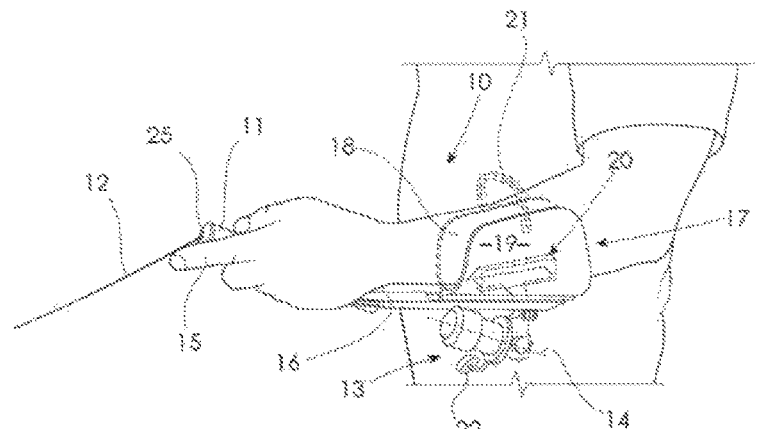
FIG. 1 is a side view of one form of fishing apparatus according to this invention positioned on an anglers forearm.

The fishing apparatus 10 illustrated in FIG. 1 utilises an in-line handpiece 11 through which fishing line 12 passes from a fishing reel assembly 13 which is supported with its feed axis 14 substantially in line with the axis of the handpiece 11. As illustrated the fishing line exits the handpiece 11 for deployment in a manner enabling the line to be monitored by an angler's forefinger 15 of their hand holding the handpiece 11.

A forearm mounting 16 extends rearward from the handpiece 11 to a mounting assembly 17 which provides an adjustable mounting for the fishing reel assembly 13 as well as a pair of opposed resilient holding panels 18, 19 which form a saddle which partially captures the user's forearm to support the weight of the forearm mounting 16 and the supported fishing reel assembly 13. The forearm mounting may also include a loop or hook portion 21 which in use extends over the users forearm.

The reel mounting is disposed on the inside holding panel 18 as illustrated in dotted outline at 20 whereby the winding handle 22 of the fishing reel assembly 13 may be operated by the angler's right hand.

The hand piece 11 is formed integrally with the forearm mounting 16 and the holding panels 18, 19 as a plastic moulding. The adjustable reel mounting 20 may also be formed integrally with the forearm mounting 16 or it may be formed as a separate component secured, such as by rivets, screws or welding for example, to the outside face of the inside forearm panel 18 for mounting the conventional opposed prongs of a fishing reel, as shown in dotted outline.

The handpiece 11 is substantially cylindrical and formed with a conical inside surface which facilitates threading a line from the fishing reel assembly 13 through the small outlet guide aperture 25 in the outer end of the handpiece 11. This conical inside surface which diverges rearward from the outlet guide aperture 25 also provides clearance to minimise frictional engagement of the line portion passing from the fishing reel assembly 13 to the outlet 25.

In use, an angler can select their fishing reel 13 of choice and connect it to the mounting 20. The fishing line is then fed through the handpiece 11 whereupon the desired tackle may be attached to the line 12. The angler then grasps the handpiece 11 and engages the holding panels 19 about their forearm so that the fishing apparatus may be operatively suspended beneath the user's left forearm as shown ready for use.

The angler can use their right hand to hand cast the fishing line 12 whereafter their right-hand may be used to adjust the drag on the reel assembly 13 and/or to wind in the fishing line as required. In the position illustrated, the left hand may be quickly elevated in response to a bite monitored by the forefinger 15 and when a fish is hooked, irrespective of its size, the fish may be played without the angler having to grasp the line and risk possible injury.

While a fish is being played, retrieval pulls of the handpiece will be relayed directly to the fishing line, as compared to initial bending of the rod in rod and reel fishing, which will enable a user to directly feel the action of the fish while also enabling the line to feed out against the drag setting chosen by the angle which may be adjusted at any time with their right hand.

Figure 2:
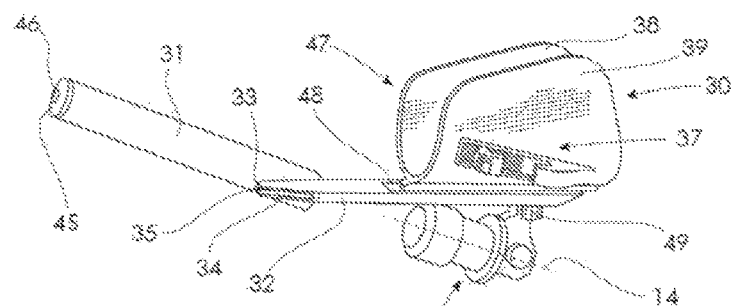
FIG. 2 is a side view which illustrates another embodiment of the invention.
Figure 3:
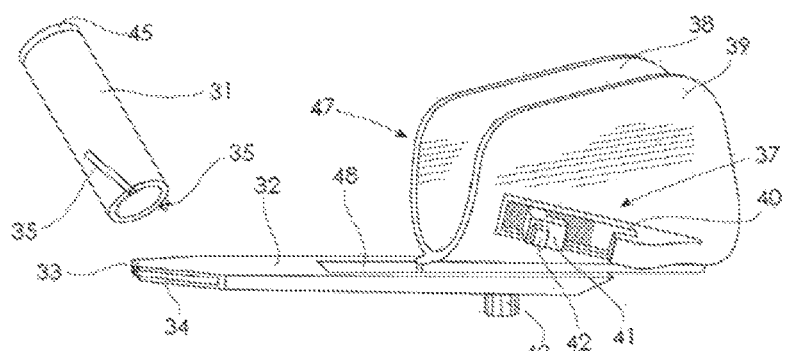
FIG. 3 is an enlarged side view of the forearm supported portion of the fishing apparatus illustrated in FIG. 2 with the handpiece detached.

The fishing apparatus 30 illustrated in FIGS. 2 and 3 is similar in operation to the fishing apparatus 10 illustrated in FIG. 1, however in this embodiment the handpiece 31 is detachably secured to the forearm mounting 32 through a selected one of a pair of opposed diverging open ended mounting slots 33 and 34 provided in the front end of the mounting 32 at an angular orientation relative to the forearm mounting 32 for comfortable placement of the handpiece 31 in an angler's hand, whether that be their left hand or their right hand of the arm on which the apparatus is located. For this purpose the handgrip 31 is provided with opposed mounting rails 35 at opposite sides of the handpiece. A selected one of these rails 35 can be slid into captive engagement with a respective one of mounting slots 33, 34 to secure the handpiece 31 to the forearm mounting 32.

The fishing apparatus 30 illustrated in FIG. 2 is setup for left arm support. For right-hand support the handpiece 31 is slid outwardly from the mounting slot 33 and the opposite mounting rail 35 is engaged in the mounting slot 34.

The fishing apparatus 30 also provides oppositely arranged reel mounts 37 disposed on the respective outside faces of the panels 38 and 39 whereby a fishing reel assembly 13 may be mounted at opposite sides of the fishing apparatus 30 to suit a left or right hand configuration of the handpiece 31. Each reel mount 37, only one of which is illustrated, is configured so as to position the reel assembly 13 with its feed axis 14 substantially coaxial with the axis of the cylindrical handpiece 31 and includes a fixed mounting slot 40 and an opposed adjustable retainer 41 provided with a release button 42 to enable the retainer 41 to be moved to and from the fixed mounting 40 to clamp the opposed prongs of a conventional a fishing reel to the fishing apparatus 30 in conventional manner.

In this embodiment the handpiece 31 is provided with a removable end cap 45 which may be removed to facilitate threading line from the chosen reel 13 through the handpiece and through the small guide aperture 46 formed in the end cap 45, which may be then plugged back into the handpiece to form the outlet therefrom which confines the line for ready monitoring by the user's forefinger.

Also in this embodiment, the opposed panels 38, 39 and reel mounts 37 are formed as a mounting assembly 47 which is slidably engaged in a captive slot 48 formed in forearm mounting 32. This enables the overall separation between the handpiece and the panels 38 and 39 to be selectively adjusted to suit the user. A thumb screw 49 may be used to lock the mounting assembly 47 in the desired position along the forearm support 32.

Figure 4:
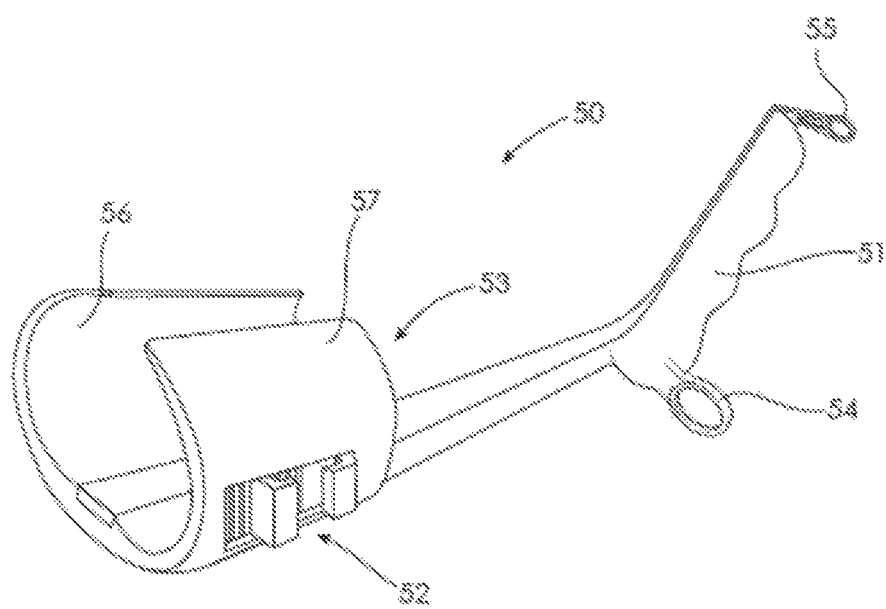
FIG. 4 illustrates a further embodiment of this invention.

In the embodiment illustrated in FIG. 4, the fishing apparatus 50 utilises a pistol grip type handpiece 51 and an adjustable reel mounting 52 associated with the forearm support assembly 53. An inner line guide 54 is provided at the lower end of the handpiece 51 and an outer line guide 55 is supported adjacent the upper end of the handpiece 51. The line guides 54, 55 are positioned so as to hold the line sufficiently clear of the handpiece so as not to interfere with an angler's grip thereof.

In use, line is fed from a supported reel, through the lower guide 54 at which it is turned upwardly to pass through the top guide 55. For hand casting, a suitable length of line is fed past the upper guide 55 to enable the line to be effectively hand cast from the supported reel (not shown). Once the line has been cast, the angler may place their monitoring finger on the line either intermediate the guides 54, 55 or on the line beyond the upper guide 55. As in the previous embodiments, opposed resilient holding panels 56, 57 are provided for locating the support assembly in an underslung position on a angler's forearm.

Figure 5:
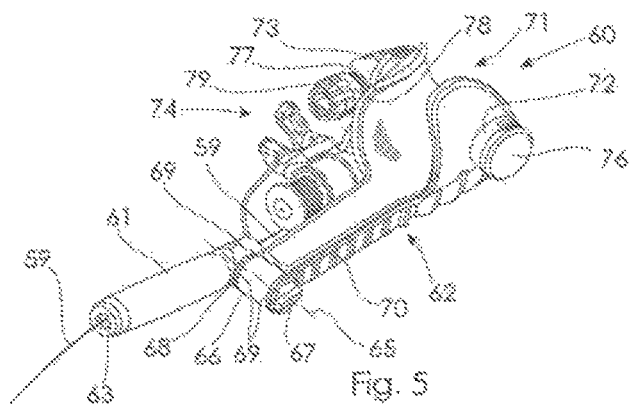
FIGS. 5 to 7 illustrate yet another embodiment of the invention.
Figure 6:
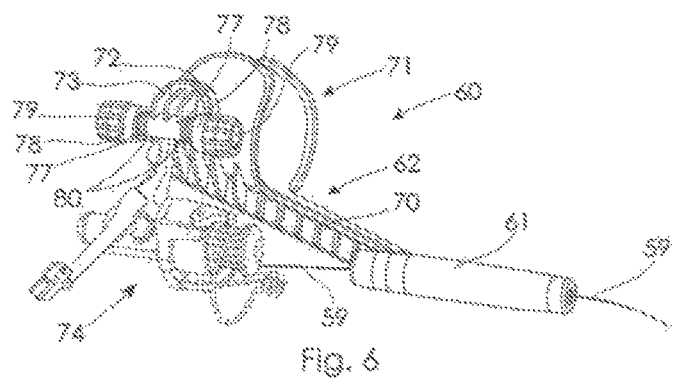
Figure 7:
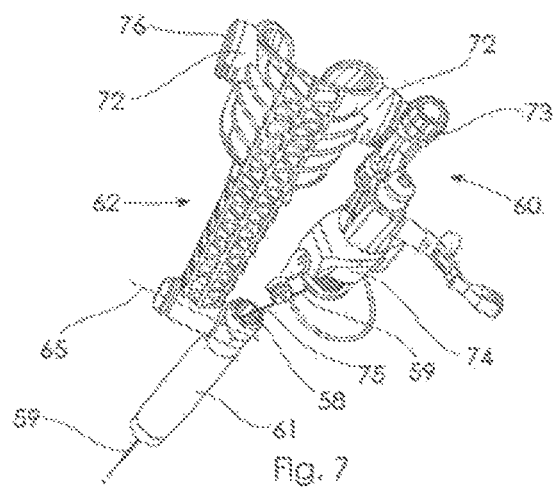

The fishing apparatus 60 illustrated in FIGS. 5 to 7 has a detachable handpiece 61 that can be mounted left or right hand side of the forearm support assembly 62 to suit the user. The handpiece 61 can be easily adjusted for comfort of user and ease of feel of the line 59 passing from the outer end 63 of a line passage 58 through the handpiece 61, by rotating the handpiece 61 about the axis 65 of the cylindrical mounting trunnion 66 which extends across the outer end of the forearm support assembly 62.

The handpiece 61 is secured in the cylindrical trunnion 66 by a wing nut assembly 67 screwed onto a transverse stud extending centrally into the trunnion 66 from the radially serrated base 68 formed at one side of the handpiece 61. A complementary serrated end face 69 is formed at each end of the cylindrical trunnion 66 so that the wing nut assembly may be tightened to fixedly secures the handpiece 61 to the forearm support assembly 62.

The wing nut 67 may be loosened to rotate the handpiece 61 about the cylindrical trunnion axis 65 to a desired angular position and then retightened to interlock the complementary serrations on the end 69 with the serrated base 68 and thus lock the handpiece 61 in a desired angular relationship with respect to the forearm support assembly 62 to suit the personal comfort of a user.

The cylindrical trunnion 66 extends transversely to the longitudinal axis of the forearm support assembly 62 which includes a spine portion 70 which extends rearward from the cylindrical trunnion to an inverted saddle assembly 71 adapted for engagement about a user's forearm. Cylindrical fishing reel mounts 72 are formed on the exterior faces at both sides of the saddle assembly 71 to allow left or right mounting of a fishing reel mounting assembly 73 thereto to which a conventional fishing reel, shown dotted at 74 in FIG. 6, may be connected.

The mounting assembly 73 can be screw fastened to either mount 72 for left or right hand use, and the mounting arrangement is such that the mounting assembly 73 can be rotated about the axis of the selected cylindrical mount 72 to set the mounted fishing reel at an angle whereby its feed axis is substantially in line with the line passage 58 through the handpiece 61 to assist feed of the line from the reel 74 to the rear open end 75 of the handpiece 61 for passage therethrough.

The reel mounting assembly 73 is formed as a typical fishing reel mounting assembly 73 which is capable of securing most types of standard fishing reels to the fishing apparatus 60. For this purpose the mounting assembly 73 has opposed threaded end mounts 77 along which collars 78 may be forced by screw caps 79 to trap the opposed mounting prongs 80 provided on the reel 74. A cap 76 is provided for covering the mounting assembly 73 which is not in use.

The internal surface of the cuff assembly 71 may partially or fully surround the forearm for support of the rear end of the spine portion 70 together with the fishing reel 74 mounted thereon. This internal surface of the saddle may be lined with an insert of suitable material too pad the arm for different sized forearms to suit the particular user. Furthermore the saddle assembly 71 may flex to accommodate the differing sizes of user forearms.

While in this embodiment the reel mounting assembly 73 is screwed to the reel mount 72, this attachment be by way of a fastening screw, bolt or bayonet style connection to the cuff side mount 72. Furthermore, while in this embodiment the spine portion 70 and the cuff assembly 71 are formed as a one piece plastics moulding of relatively stiff material these parts could be formed as individual components adjustably connected to one another to enable the operative length of the spine to be adjusted to suit different size users.

Suitably a release/locking mechanism for such adjustment would be formed on the underside of the mainframe leaving its top surface unobstructed for lying snug against the underside of a user's forearm to comfortably accommodate the applied forces when the force of the line at the tip of the handpiece is tensioned during fishing. It will also be seen that the handpiece 61 may be released and rotated backward to lie alongside the spine 70 for compact storage.

It will be seen from the above that fishing apparatus is provided which enables a user to set up for hand cast fishing and at the same time have the convenience and drag control provided by the use of a fishing reel of choice and the safety of hand fishing without grasping the fishing line. It will also be seen that the apparatus may be made in a demountable form enabling very compact storage and of relatively robust form which will not damage easily when stored in a tackle box or the like.

It is to be understood that individual features illustrated in each embodiment could also be incorporated into other embodiments described and/or illustrated herein. However for succinctness this specification does not contain illustrations and/or descriptions of all embodiments containing all possible variations of such features.

It will of course be realised that while the above has been given by way of example of this invention all such modifications and variations thereto as would be apparent to persons skilled in the art are deemed to fall within the broad scope and ambit of this invention as is defined in the appended claims.

I claim:

1. Hand cast fishing apparatus comprising:
   a handpiece having an internal line passage connected to an arm support, the arm support adapted to abut a section of the ulnar side and to capture a portion of a user's forearm;
   a line guide formed by the outer end of the internal line passage and being at or adjacent the outer end of the handpiece through which fishing line may pass for casting; and
   a support assembly depending from the arm support having a left and/or right hand releasable reel mounting each of which can operatively secure and position a fishing reel for feeding fishing line from the fishing reel through the line guide in an underslung position beneath the support assembly with its winding mechanism operable by a user's opposite hand, wherein the left and/or right hand releasable reel mounting is fastened to a mount.

2. Hand cast fishing apparatus as claimed in claim 1, wherein the line guide positions a cast fishing line across the extended forefinger of a user's hand when operatively grasping the handpiece.

3. Hand cast fishing apparatus as claimed in claim 1, wherein the arm support is formed so as to extend from the handpiece along the ulnar side of the forearm of a user operatively grasping the handpiece.

4. Hand cast fishing apparatus as claimed in claim 1, wherein the arm support includes a saddle to capture the portion of a user's forearm.

5. Hand cast fishing apparatus as claimed in claim 4, wherein the relative position of the saddle to the handpiece is reversibly adjustable.

6. Hand cast fishing apparatus as claimed in claim 1, wherein the handpiece position relative to the arm support is selectively adjustable.

7. Hand cast fishing apparatus as claimed in claim 6, further including reversible securing means for the handpiece to the arm support to displace the handpiece to the left or right hand side of the arm support.

8. Hand cast fishing apparatus as claimed in claim 7, wherein the securing means includes a pair of opposed rails on the handpiece for selective captive engagement with a pair of mounting slots on the arm support.

9. Hand cast fishing apparatus as claimed in claim 7, wherein the securing means includes a trunnion mounting extending laterally at or near the end of the arm support whereby the handpiece may be selectively supported at either end of the trunnion mounting.

10. Hand cast fishing apparatus as claimed in claim 1, further including a fishing reel attached to one of the reel mountings.

11. Hand cast fishing apparatus as claimed in claim 1, wherein the mount is a cylindrical mount.

12. Hand cast fishing apparatus as claimed in claim 11, wherein the cylindrical mount is attached to the arm support such that the left and/or right hand releasable reel mounting assembly is configured to be rotated about the axis of the cylindrical mount.

13. Hand cast fishing apparatus as claimed in claim 12, wherein the left and/or right hand releasable reel mounting assembly is configured to be rotated about the axis of the cylindrical mount to set the fishing reel at an angle whereby its feed axis is substantially in line with the internal line passage.

14. Hand cast fishing apparatus as claimed in claim 1, wherein the left and/or right hand releasable reel mounting assembly includes opposed treaded end mounts.

15. A hand cast fishing apparatus comprising:
    a handpiece having an internal line passage connected to an arm support, the arm support configured to be secured to the ulnar side of a user's forearm;
    a line guide formed by the outer end of the internal line passage and being at or adjacent the outer end of the handpiece through which fishing line may pass for casting;
    a pair of mounts attached to opposing sides of the arm support; and,
    a support assembly depending from the arm support having a reel mounting assembly configured to secure and position a fishing reel for feeding fishing line from the fishing reel through the line guide in an underslung position beneath the support assembly with its winding mechanism operable by a user's opposite hand, wherein the reel mounting assembly is configured to be releasably fastened to either mount of the pair of mounts for left or right hand use.

16. The hand cast fishing apparatus of claim 15, wherein the reel mounting assembly is configured to be rotated about either mount of the pair of mounts.

\* \* \* \* \*